Jan. 3, 1967 R. G. HIBBARD ETAL 3,295,721
WEEDICIDE SOLUTION APPLICATOR
Filed May 14, 1964 4 Sheets-Sheet 1

INVENTORS.
ROWLAND G. HIBBARD
EARL CATHCART
BY
Van Valkenburgh and Fields
ATTORNEYS

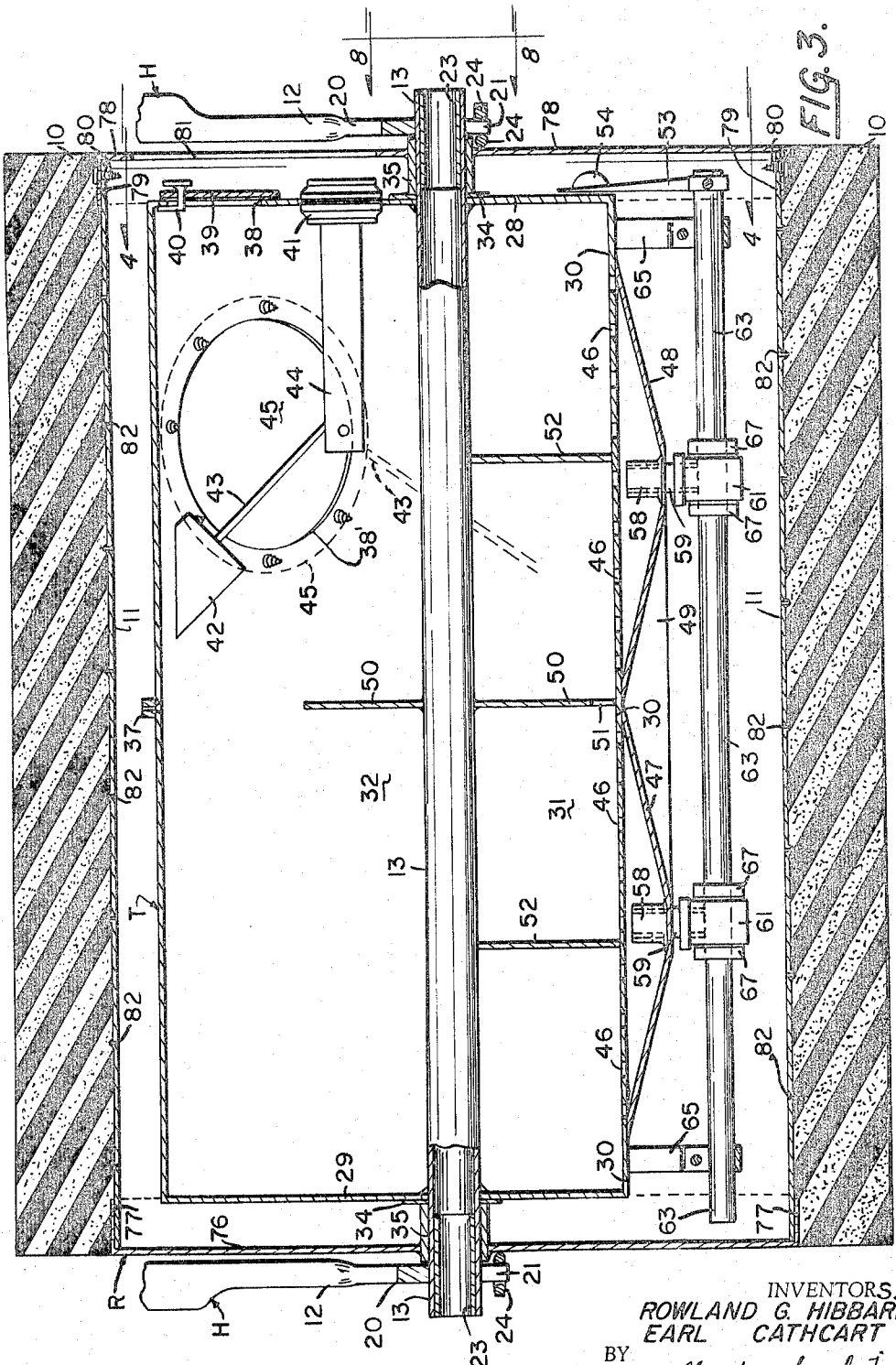

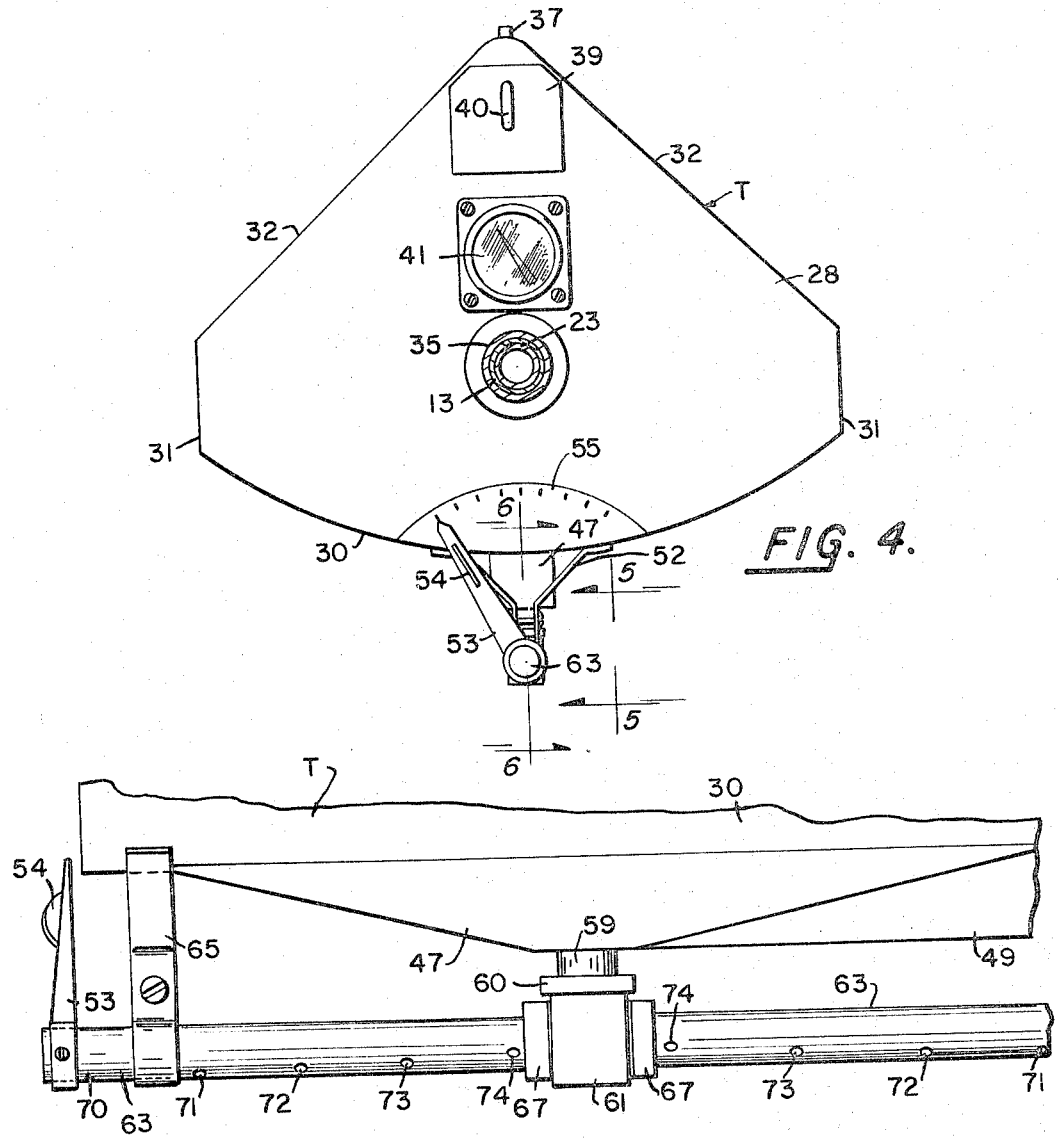

Jan. 3, 1967   R. G. HIBBARD ETAL   3,295,721
WEEDICIDE SOLUTION APPLICATOR

Filed May 14, 1964   4 Sheets-Sheet 4

INVENTORS.
ROWLAND G. HIBBARD
EARL CATHCART
BY
Van Valkenburgh and Fields
ATTORNEYS

# United States Patent Office 3,295,721
Patented Jan. 3, 1967

3,295,721
WEEDICIDE SOLUTION APPLICATOR
Rowland G. Hibbard, 320 Broadwater Ave., and Earl
Cathcart, 30 Broadwater Ave., both of Billings, Mont.
59102
Filed May 14, 1964, Ser. No. 367,530
15 Claims. (Cl. 222—51)

This invention relates to a solution applicator, and more particularly to an applicator for applying to a clearly defined area of a lawn or the like a solution, such as containing a weedicide, i.e. a weed killing chemical.

Previous to this invention, a weedicide solution has been applied to lawns by means of sprayers or by devices which apply the weedicide to a single weed at a time. However, each of these types of applicator has certain inherent disadvantages. The sprayers find their greatest use for large lawns, such as in parks, golf courses and cemeteries. However, there is always a constant danger that the wind will blow the spray into adjacent flower beds, shrubs or trees, causing serious damage and even possibly killing some of the flowers, trees or shrubbery. Furthermore, when used in a cemetery, the spray which contacts the grave markers often stains or discolors them and produces an appearance which is often objectionable. The applicators which apply weedicide to a single weed are relatively effective for use by a home owner who has a small lawn, but are clearly impractical for parks, golf courses and cemeteries, where a large area should be covered in a relatively short time.

Among the objects of this invention are to provide a novel applicator for a weedicide or the like; to provide such a weedicide applicator which will not contaminate adjacent flowers, shrubs, trees or other adjacent structures, such as grave markers; to provide such a weedicide applicator by which the weedicide is readily applied to a lawn or the like having a relatively large area; to provide such a weedicide applicator in which the flow of weedicide onto the lawn can be controlled within accurate limits; to provide such a weedicide applicator in which a supply tank is mounted in a protected position; to provide such a weedicide applicator wherein the supply tank is constructed to assure the flow of weedicide when the applicator is used on the side of a hill; to provide such a weedicide applicator having means which assures even saturation of a sponge of a roller thereof; to provide such a weedicide applicator having a supply indicator; to provide such a weedicide applicator having means for supporting the sponge roller thereof above the ground when not in use; to provide such a weedicide applicator having a handle support for use in conjunction with a kick stand for supporting the applicator; to provide such a weedicide applicator in which the supply tank is easily filled; to provide such a weedicide applicator which is easy to use; to provide such a weedicide applicator which is easy to dismantle and clean; and to provide such a weedicide applicator which is of simple construction.

Additional objects and the novel features of this invention will become apparent from the description which follows, taken in conjunction with the accompanying drawings, in which:

FIG. 3 is an enlarged longitudinal section, taken along line 3—3 of FIG. 2, showing details of a supply tank and roller thereof;

FIG. 4 is a vertical section, taken along line 4—4 of FIG. 3, showing one end of the supply tank and also a gauge, filler cap and flow adjustment handle;

FIG. 5 is an enlarged, fragmentary rear view, taken from the position of line 5—5 of FIG. 4, of a portion of a discharge pipe, showing one of the sumps of the supply tank connected thereto;

Figure 1:
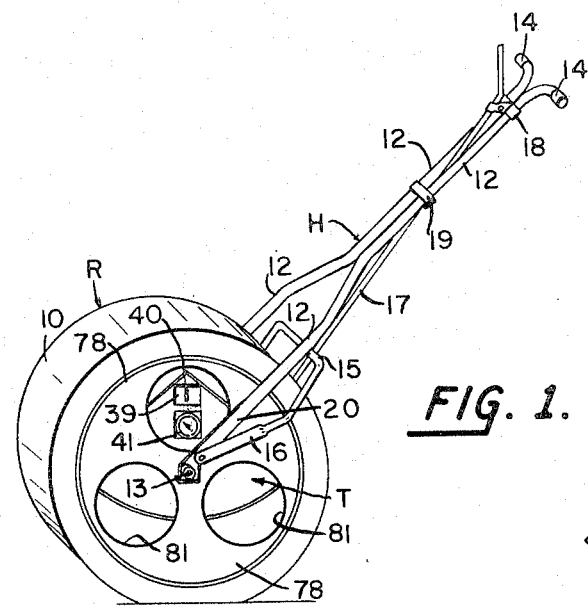
FIG. 1 is a side perspective view of a weedicide applicator of this invention, in position for use.
Figure 2:
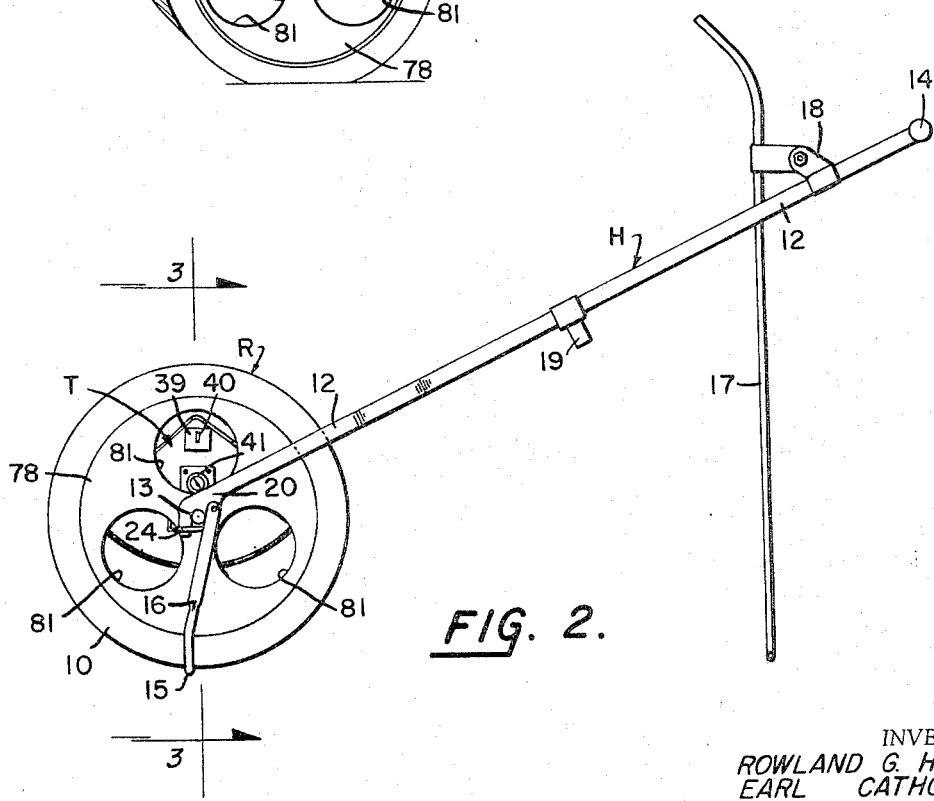
FIG. 2 is a side elevation of the weedicide applicator of FIG. 1, with a handle support and kick stand supporting a roller of the applictor above the ground.

In accordance with this invention, a weedicide applicator is provided having a roller R, as in FIGS. 1 and 2, to which is attached a handle H, and having a weedicide supply tank T mounted within the roller and from which a weedicide solution is dispensed at a predetermined flow rate to the roller. The roller or applicator includes a cylindrical "sponge" 10 made of synthetic sponge-like material, such as formed of plastic or rubber in a conventional manner, which is received over a perforated drum 11, as in FIG. 3, in a manner to be described. The applicator may be pushed across the lawn by means of handle H, conveniently formed from tubular arms 12 which diverge and then become parallel at the front, thereby extending past each end of roller R for attachment to the opposite ends of axle 13, about which roller R rotates. At the opposite end, arms 12 diverge in opposite directions to form hand handles 14. When not in use, the roller R may be supported by a generally U-shaped kick stand 15 which is pivoted by angular arms 16 to yoke arms 12 adjacent but rearwardly of axle 13. Thus, the kick stand 15 holds sponge 10 off the ground, as in FIG. 2, so that weedicide is not transferred to the ground through the sponge and also so that the sponge does not become flat on one side. The handle H is held in the position of FIG. 2 by a support leg 17, pivotally attached to the upper end of the handle by means of a pivot bracket 18 which also conveniently attaches the two tubes of handle H together. The lower end of leg 17 rests on the ground, as in FIG. 2, being placed there after the roller R is rocked back onto the kick stand 15 which rests on the ground forwardly of the shaft 13, due to the angularity of arms 16. Thus, the kick stand 15 and support 17, in cooperation with handle 14, hold the roller R above the ground for the purpose described above.

The kick stand 15, when not in use, is placed in a storage position, as in FIG. 1, being held up by the lower end of support leg 17 when the latter is in the storage position shown, by means of a spring clip 19 adapted to resiliently engage the support leg and also conveniently attaching the two tubes of handle H together.

Figure 8:
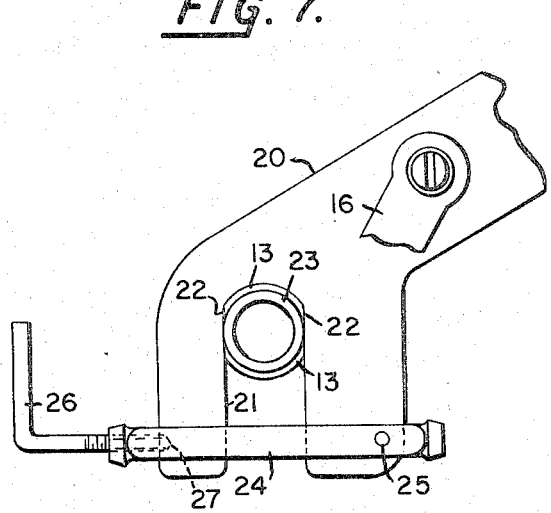
FIG. 8 is an enlarged, fragmentary view of one end of the axle, taken from the position of line 8—8 of FIG. 3, showing the manner in which the handle may be removably attached thereto.

The lower end of each tube 12 may be flattened onto and welded to a flat, angular plate 20, as in FIGS. 3 and 8, the lower end of which has a slot 21, the edges of which engage flats 22 at the end of axle 13, as in FIG. 8, so that the axle and handle are interlocked. Axle 13 may be reinforced at each end by an inner sleeve 23, as in FIG. 3, which assists in resisting the stress imposed by handle H and also the journaling of roller R thereon, as described later. The interlocking arrangement between the axle and the handle serves particularly to maintain the tank T in upright position when the applicator is in use or in storage position. Each plate 20 may be clamped to shaft 13 by a clevis 24 which, as in FIG. 8, is pivoted on the lower rear corner of plate 20 by means of a pivot pin 25 and is adapted to be swung to the horizontal clamping position, as shown, in which a threaded locking handle 26 is turned into a threaded hole in the cross bar of clevis 24 until the preferably conical inner end thereof seats in a socket 27 in the front edge of plate 20. As will be evident, by loosening each of lock handles 26 and swinging clevises 24 downwardly and rearwardly, handle H can be quickly and easily removed from axle 13, so that tank T can be removed from the inside of roller R, in a manner to be described, for cleaning or repair.

The tank T, as in FIGS. 3 and 4, has spaced end walls 28 and 29 conveniently formed integrally with an arcuate bottom 30, short vertical side walls 31 and converging top walls 32, attached together in a suitable manner, as by welding, to provide a sector shaped cross section through which axle 13 extends below its center of height but at about its center of gravity, for balancing purposes and greater ease of handling. Tank T is preferably mounted solidly on axle 13, as by welding the same thereto, or at least sealed thereto, while the ends of tank T may act as a thrust surface for a flange 34 of a bushing 35 at each end of roller R and through which roller R rotates about axle 13. An air vent 37 is desirably provided at the top edge of the tank, as in FIG. 3, while end wall 28 is provided with hole 38 for filling the tank with the weedicide solution, which hole is normally closed by a cover 39 hinged to side wall 28 along its lower edge and held in place by a pivoted handle 40. A solution supply gauge 41, mounted in wall 28, is operatively connected to a float 42, as in FIG. 3, the latter being connected through an arm 43 to the gauge mechanism in a housing 44. Conveniently, the float 42 is shaped, as shown, so that it will not touch the top of the tank and cause an inaccurate reading of the gauge. One of the top walls 32 is preferably provided with an access hole 38', useful for mounting the gauge 41, gauge mechanism 44, float 42 and filling cover 39 in the tank, as well as checking the alignment of holes 46, described below, in the bottom of the tank. Access hole 38' is conveniently covered by a removable cover plate 45, attached to the tank by screws, bolts or the like.

In accordance with this invention, the bottom 30 of the tank is provided with a plurality of longitudinally spaced holes 46 through which the solution drains from the tank into a pair of sumps 47 and 48 which are generally box shaped but slope upwardly on the underside from each side of center, as in FIGS. 3–6. The sumps may be interconnected by a reinforcing gusset 49. The purpose of the sumps is to assure the flow of weedicide solution to each end of the roller when the roller is being used on the side of a hill, so that the solution will be applied to the ground evenly. The holes 46 leading to the respective sumps are separated by a central baffle 50 inside the tank and extending upwardly about two-thirds the height of the tank T, with an opening 51 at the bottom thereof to allow the solution to flow slowly from one side of the baffle to the other, when the device is on the side of a hill and the supply of solution in the tank is below the top of baffle 50. In addition, a pair of intermediate baffles 52, extending only up to axle 13, may be provided to further assist in insuring a supply of liquid to all of the holes 46 when the applicator is being used on the side of a hill.

The applicator of this invention is provided with flow regulating means, conveniently mounted below the tank T and adjusted by a regulating and indicating handle 53 of FIG. 4, having a finger grip 54 and mounted to indicate on a scale 55 the rate of flow, as in FIG. 4. The flow of the solution to such flow regulating means from the sumps 47 and 48 is through registering holes 56 and 57 in a bushing 58, welded to the base of the sump around an opening therein, and a nipple 59, which extends through the opening in the bottom of the sump and is threadably received in bushing 58. The lower end of nipple 59 is threaded into a boss 60 of a sleeve 61 having a lateral hole 62 in alignment with a boss 60 and a longitudinal hole through which extends a distribution pipe 63. Distribution pipe 63 is closed at both ends and is turnable to different positions by handle 53 to increase or decrease the amount of registry of a hole 64 at each sleeve 61, which conveniently has the same size as hole 62 in sleeve 61, so that the maximum flow will occur when holes 62 and 64 register, but will decrease when pipe 63 is turned to move hole 64 away from hole 62. Thus, the degree of registry and the consequent flow rate is indicated by the position of handle 53 on scale 55 of FIG. 4. Pipe 63 is further supported by clamping brackets 65 attached to the underside of tank T, as in FIG. 3, while leakage between each sleeve 61 and the distribution pipe 63 is prevented by packing 66 which abuts the ends of the sleeves and is pressed thereagainst by collars 67, attached to the distributing pipe by set screws 68, as in FIG. 6.

Figure 6:
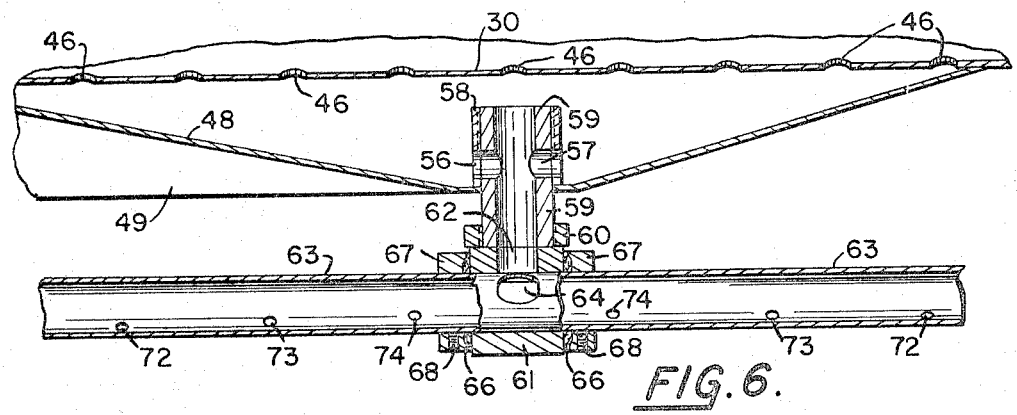
FIG. 6 is an enlarged, fragmentary, vertical section, taken along line 6—6 of FIG. 4, through the discharge tube for one of the sumps.

In further accordance with this invention, the distributing pipe has a plurality of spaced holes 70 to 74 for supplying weedicide to the inside of drum 11, as described below. In the off position, of course, openings 64 do not register with holes 62 and all flow of weedicide from tank T to roller R is prevented. However, between this position and the full flow position, distribution pipe 63 will rotate through an angle of approximately 70° and therefore it is desirable to compensate for the difference in the volume of the weedicide supplied to different parts of pipe 63, for different positions thereof, so that substantially the same amount of weedicide will be supplied to all parts of the roller R. This may be accomplished by placing outlet holes 70 to 74 along the distributing pipe in an elongated spiral segment turning through nearly 50° of the arc of the pipe. As shown in FIG. 5, the holes 70 to 74 are on the back side of the pipe; thus, the holes are not shown in FIG. 3. However, the holes are visible on the inside of the pipe, in the sectional view of FIG. 6. Thus, the holes 70 closest to each end of the pipe are arranged so as to be on the bottom of the pipe, when it is turned to the off position, with each additional hole 71 to 74 progressing inwardly from each end of the pipe, approximately 12° higher on the side of the tube, as shown in FIGS. 5 and 6, to the sleeve 61. The central hole 71 between the sleeves is conveniently at the same level as each hole 71, second from the end of the pipe, with holes 72 to 74, from the center toward each sleeve 61, in positions corresponding to outer holes 72 to 74. With this arrangement, it is assured that the end holes and center hole, farthest from the sleeves 61, will be supplied with the weedicide solution when the volume control is set for a low flow rate, while at higher flow rates, the tube will be full or close to full and the weedicide solution will be supplied to all discharge holes at whatever height or position on the distributing pipe. Actually, the setting of the holes is such that during any normal operation all holes will be supplied with weedicide.

One end of roller R is closed by a disc 76 having an inturned peripheral flange 77, attached to drum 11, as by welding, and a central hole through which bushing 35 extends and is welded thereto, for rotatably supporting one end of roller R on axle 13, as described above. The opposite end of the roller R is closed by a disc 78 similarly having an inturned peripheral flange 79, but which is removably attached to drum 11 by a plurality of circumferentially spaced screws 80, conveniently sheet metal screws. Disc 78 has a central hole through which bushing 35 extends and is welded thereto, for rotatably supporting the other end of roller R on axle 13. In addition, disc 78 may be provided with three circular openings 81, spaced 120° from each other, as in FIG. 2, to provide access to the filler cap 40, the indicating gauge 41 and the flow control lever 53.

Figure 7:
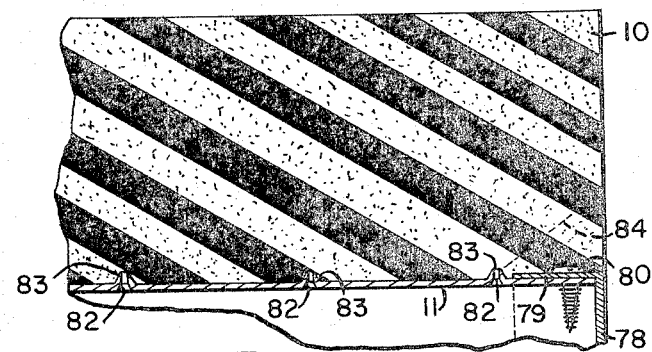
FIG. 7 is an enlarged, fragmentary section taken through one corner of the roller and corresponding to a small portion of FIG. 3, showing the attachment of a removable disc and a cylindrical sponge to a drum.

Conveniently, the cylindrical sponge 10 is sized about one-half inch less in diameter than the diameter of drum 11, so that it will tightly grip the drum. The drum is provided with a series of longitudinaly and laterally spaced, outwardly punched holes 82, as in FIGS. 3 and 7, which serve the dual function of providing outwardly extending projections 83 which engage the inner surface of the sponge to hold it in place on the drum, so that it will not slip, and of permitting the weedicide solution which is dispensed from distributing pipe 63 to pass through drum 11 and saturate sponge 10. To install the sponge on the drum, the sponge is conveniently first slipped onto a smooth cylindrical sleeve (not shown) which has a diameter greater than that of the drum, and the sponge and sleeve slid over the drum, then the sleeve is withdrawn from inside the sponge, so that the sponge will elastically grip the cylinder and will be penetrated by metal projections 83. In the event that the operator wishes to remove the tank T and associated parts from inside the drum, as for inspection, repair or replacement of parts, it is necessary only to remove the handle H, in the manner previously described, then lift the edge of the sponge off the drum 11, as to the dotted position 84 of FIG. 7, at the position of each screw 80, in turn, which may be removed while the sponge is so lifted. With disc 78 thus detached from drum 11, it may be slid off the end of axle 13 after which the drum, with disc 76 fixed thereto, is slipped off the opposite end of the axle and then moved endwise off the tank, or vice versa. Then, the tank and axle assembly will be accessible from all points on the outside. After inspection or repair, the above steps may be reversed for reassembly, as will be evident.

For assisting the operator in setting the feed control handle 53, an odometer (not shown) may be mounted on the handle H, for engagement by a trip mounted on end disc 76, to indicated the distance travelled. The odometer may be calibrated in terms of the square yards of area covered. For instance, if the sponge 10 is 36 inches or one yard wide and 36 inches or one yard in circumference, then each revolution of the roller R will cover one square yard and the odometer may be so calibrated. It will be understood, of course, that the above example is illustrative only, since a convenient size for use in cemteries, particularly for movement between grave markers, is a length of 20 inches and an outer diameter of 18 inches for the sponge 10, or about 0.873 square yard per revolution. It will be understood, of course, that the dimensions of sponge 10, as well as other parts, may vary considerably. In any event, if the odometer is calibrated to indicate the number of square yards of lawn or the like covered, the operator may set the volume control so that the number of gallons per square yard recommended by the supplier of the weedicide solution will be supplied to the sponge for the normal rate of travel of the operator. Or, the operator may set the volume control handle 53 for a certain rate of flow and then use the odometer as a check to insure that the square yards covered in any given time period, such as one minute or five minutes, is that recommended for the flow rate for which handle 53 is set.

As will be evident, when the roller R is supported by the kick stand 15, as in FIG. 2, the roller may be easily turned by hand to position one of the openings 81 in position to facilitate viewing the gauge 41, opening cover 39 and filling the tank, or adjusting the flow control handle 53. The roller may also be revolved, while on the kick stand, to permit the sponge 10 to become saturated with the solution before pushing the roller off the kick stand and starting the application of the weedicide solution to a lawn or the like, so that the amount of solution applied from the start will correspond to the setting of the volume control.

From the foregoing, it can be seen that a weedicide applicator has been provided which fulfills to a marked degree the requirements and objects hereinbefore set forth. The weedicide applicator supplies weedicide solution to a sponge rubber roller which applies it directly to the lawn without contaminating adjacent flowers or shrubs. Furthermore, the weedicide is fed from a storage tank within the roller to a distributor pipe whose flow can be varied by a flow control handle mounted on one end thereof. Also, the distributor pipe is provided with discharge holes which are positioned in a flat spiral, so that the holes are lower in the pipe at the points most distant from the supply points. Furthermore, the device is supplied with a kick stand and has a handle support for supporting the roller above the ground when not in use, so that weedicide is not lost through the roller and so that the roller will not become flat on one side. A filler cap is provided in the tank so that it may be filled without removing the tank from the roller, and the tank is provided with a supply indicator. In addition, the tank has baffles and sumps therein, so that the device may be used on the side of a hill with assurance that weedicide solution will be supplied to all parts of the roller. Furthermore, the drum is perforated to perform the dual function of supplying weedicide solution to the sponge roller and of providing projections which engage the sponge to hold it in place on the roller. Finally, the weedicide applicator is easy to dismantle and clean and is relatively easy to use.

Although a preferred form of this invention has been illustrated and described, it will be understood that various changes and variations may be made, all without departing from the spirit and scope of this invention.

What is claimed is:

1. An applicator for a weedicide solution and the like, comprising a hollow roller having an absorbent periphery for applying said solution to a lawn and the like;
   a supply tank within said roller for containing said solution to be supplied to the inside of said roller;
   a distributing pipe extending longitudinally beneath said tank and having a plurality of discharge openings therein;
   at least two supply means for supplying solution from said tank to the inside of said distributing pipe and providing means for controlling the flow of solution to said pipe at spaced points along said pipe; and
   a handle operatively connected to said roller for moving said roller across said lawn and the like.

2. An applicator, as set forth in claim 1, wherein said controlling means is responsive to the angular position of said distribution pipe.

3. An applicator for a weedicide solution and the like, comprising a hollow roller having an absorbent periphery for applying said solution to a lawn and the like;
   a supply tank within said roller for containing said solution to be supplied to the inside of said roller;
   a distributing pipe extending longitudinally beneath said tank and having a plurality of discharge openings therein;
   a plurality of spaced sumps below the bottom of said supply tank, the bottom wall of said supply tank having a plurality of holes therein through which said solution flows into said sumps and said sumps supplying said solution to said distributing pipe; and
   a handle operatively connected to said roller for moving said roller across said lawn and the like.

4. An applicator, as set forth in claim 3, including a center baffle extending upwardly from said bottom wall of said supply tank at a position between said sumps, and having an opening at the lower edge thereof to permit solution to flow from one side of said baffle to the other side of said baffle.

5. An applicator, as set forth in claim 4, further including side baffles in said supply tank, each side baffle extending upwardly from the bottom of said tank at a position between said center baffle and an end of said tank.

6. An applicator for supplying a weedicide solution and the like to a lawn and the like, comprising:
   a hollow roller having an absorbent periphery and having at least one opening in one end thereof;
   a supply tank within said roller for said solution to be supplied to the interior of said cylinder;

a handle operatively connected with said roller for moving said roller across said lawn and the like;

means connected to said handle for supporting said supply tank within said roller in a stationary position with respect to said handle; and said tank having a filling opening and a cover therefor accessible through said opening in said end of said roller.

7. An applicator, as set forth in claim 6, including a gauge mounted in the corresponding end of said supply tank and visible through said opening when in registry therewith for indicating the amount of solution therein.

8. An applicator, as set forth in claim 6, wherein said end of said roller is removable so that said supply tank may be removed from said roller for inspection, cleaning or repair.

9. An applicator for a weedicide solution and the like, comprising a hollow roller having an absorbent periphery for applying said solution to a lawn and the like;

a supply tank within said roller for containing said solution to be supplied to the inside of said roller;

a distributing pipe extending longitudinally beneath said tank and having a plurality of discharge openings therein;

means for supplying solution from said tank to the inside of said distributing pipe;

a handle operatively connected to said roller for moving said roller across said lawn and the like; and means connected to said handle for supporting said supply tank within said roller in a stationary position with respect to said handle.

10. An applicator, as set forth in claim 9, wherein said discharge openings are spaced longitudinally of said distributor pipe and are closer to the bottom of said pipe adjacent the ends and center thereof.

11. An applicator, as set forth in claim 10, wherein said openings are located on an elongated spiral segment.

12. An applicator for supplying a weedicide solution and the like to a lawn and the like, comprising:

a roller including a hollow cylinder having holes in the circumference thereof;

a resilient cylindrical member surrounding said hollow cylinder and formed of sponge-like material which has a substantial thickness and, when loaded by weight and stands at one place during an extended period of time, tends to become flattened along the area at which it is loaded;

means for storing and supplying said solution to the interior of said cylinder;

a handle connected with said roller for moving said roller across said lawn and the like;

a kick stand pivotally attached to said handle adjacent said roller and movable to a position engaging the ground; and a handle support attached to the outer portion of said handle and adapted to engage the ground, so that said roller may be supported by said kick stand and said handle support in a position in which said resilient cylindrical member is not compressed by the weight of said roller and associated parts, during an extended period of time.

13. An applicator for a weedicide solution and the like, comprising a hollow roller having an absorbent periphery for applying said solution to a lawn and the like;

a supply tank within said roller for containing said solution to be supplied to the inside of said roller;

a distributing pipe extending longitudinally beneath said tank and having a plurality of discharge openings therein;

at least two means for supplying solution from said tank to the inside of said distributing pipe at spaced points along said pipe, said supplying means controlling the flow of solution to said pipe at spaced points and responsive to the angular position of said pipe;

a control lever attached to the end of said pipe adjacent one end of said roller for turning said pipe; and a handle operatively connected to said roller for moving said roller across said lawn and the like.

14. An applicator, as set forth in claim 13, including a scale on the end of said supply tank adjacent said control lever to indicate the amount of solution being supplied to said roller.

15. An applicator, as defined in claim 13, wherein each said supplying means includes a sleeve surrounding said pipe;

openings in said sleeve and said pipe adapted to be brought into and out of registry upon turning of said pipe; and means for supplying solution from said tank to said sleeves.

References Cited by the Examiner

UNITED STATES PATENTS

| | | | |
|---|---|---|---|
| 1,212,186 | 1/1917 | Cornish | 222—23 |
| 2,325,867 | 8/1943 | Matsakas | 15—562 |
| 2,927,334 | 3/1960 | Wonso | 15—562 |
| 2,965,911 | 12/1960 | Hempel et al. | 15—562 |
| 3,157,316 | 11/1964 | Garber | 222—169 |

ROBERT B. REEVES, *Primary Examiner.*

LOUIS J. DEMBO, *Examiner.*

N. L. STACK, *Assistant Examiner.*